United States Patent [19]

Cornwell

[11] 4,334,999
[45] Jun. 15, 1982

[54] PROCESS FOR THE EXTRACTION OF METAL IONS

[75] Inventor: David A. Cornwell, Okemos, Mich.

[73] Assignee: Board of Trustees, Michigan State University, East Lansing, Mich.

[21] Appl. No.: 240,186

[22] Filed: Mar. 3, 1981

Related U.S. Application Data

[63] Continuation of Ser. No. 99,019, Nov. 30, 1979, abandoned, which is a continuation-in-part of Ser. No. 25,321, Mar. 30, 1979, abandoned.

[51] Int. Cl.$^3$ .................... B01D 11/00; C02F 1/26; C02F 1/42
[52] U.S. Cl. .................................. 210/638; 210/667; 210/711; 423/112; 423/139; 423/157; 75/101 BE; 75/121
[58] Field of Search ............... 210/634, 638, 665, 667, 210/669, 670, 681, 710, 711, 712, 713; 423/112, 132, 139, 150, 157, DIG. 14; 75/101 BE, 121

[56] References Cited

U.S. PATENT DOCUMENTS

| | | | |
|---|---|---|---|
| 2,860,031 | 11/1958 | Grinstead | 423/DIG. 14 |
| 3,649,209 | 3/1972 | Coleby | 422/269 |
| 3,959,133 | 5/1976 | Fulton | 210/711 |
| 4,008,134 | 2/1977 | Thorsen | 423/DIG. 14 |

FOREIGN PATENT DOCUMENTS

| | | |
|---|---|---|
| 860880 | 2/1961 | United Kingdom. |
| 972035 | 10/1964 | United Kingdom. |
| 1037573 | 7/1966 | United Kingdom. |

OTHER PUBLICATIONS

Zoltek and Corwell, Recycling of Alum Used for Phosphorus Removal in Domestic Water Treatment, JWPCF, Apr. 1977, 600-612.

Primary Examiner—Ernest G. Therkorn
Attorney, Agent, or Firm—Ian C. McLeod

[57] ABSTRACT

A process for extracting metal ions from a water insoluble metal base or salt dispersed in an aqueous solution using liquid ion exchange is described. The liquid ion exchange extractant is an alkyl phosphoric acid or acid phosphate (APA) which is dissolved in a water immiscible organic solvent. In contrast to prior art processes where the metal ion is dissolved in an aqueous solution, the insoluble metal base or salt is one which is reactive from an aqueous solution with the APA to replace one of the acid hydrogens to form an alkyl phosphate metal salt (APS) in the organic solvent. The metal ion can be recovered from the APS in the organic solvent by stripping with an aqueous acidic solution so that the metal ion is removed from the APS to form a metal salt in the aqueous acidic solution and the APA in the organic solvent is regenerated for reuse. The process is particularly adapted to producing alum from aluminum hydroxide which is dispersed in an aqueous sludge resulting from precipitation or coagulation with alum in potable water clarification. The aluminum ion is extracted by the APA from the aluminum hydroxide and then recovered by using an aqueous solution of sulfuric acid to remove the aluminum ion and to form aluminum sulfate in an acidic aqueous solution, referred to as "liquid alum", which can be reused.

19 Claims, 4 Drawing Figures

PRIOR ART PROCESS

PROCESS FOR THE EXTRACTION OF METAL IONS

This application is a continuation of application Ser. No. 99,019, filed Nov. 30, 1979, which is a continuation-in-part of earlier application Ser. No. 25,321, filed Mar. 30, 1979, both now abandoned.

BACKGROUND OF THE INVENTION

The present invention relates to a liquid ion exchange process for the extraction of metal ions from an insoluble hydroxide or salt dispersed, rather than dissolved, in an aqueous solution. In particular the present invention relates to a process for the recovery of aluminum, iron or magnesium sulfates used as coagulants in potable water purification, particularly aluminum sulfate or alum.

PRIOR ART

There is extensive prior art in the field of liquid ion exchange extraction processes. The basic reaction is that a metal ion is extracted from an aqueous solution by an extractant dissolved in an immiscible organic liquid. The present invention is specifically concerned only with the use of an alkyl phosphoric acid or acid phosphate (APA) as the extractant, because of the unique ability of these acids to function both as a solubilizing agent for the water insoluble metal hydroxides and salts dispersed in an aqueous solution as well as an extractant for the metal ion as described hereinafter.

More than half of the sludge-producing water treatment plants in the United States are turbidity-removal plants producing coagulant sludges containing aluminum, magnesium and/or iron hydroxides which require disposal or recovery of the coagulant. The coagulant is an acidic sulfate. These turbidity-removal plants account for about 70 percent of all water treated. About 25 percent of the waste producing plants are water softening plants. These softening plants account for about 25 percent of all water treated. The problem with sludges is similar in other countries.

The need for the elimination of direct sludge discharges has imposed both an economic and a technological problem on the water supply industry. Many facilities have been constructed based on limited available technology on the characteristics of and means for the handling, treatment and disposal of water plant sludges. In many cases, water plants have been constructed in a manner that will permit the inclusion of modifications for sludge disposal.

Recently sludge processing plants have been constructed for coagulant treatment. It appears that most coagulant sludge disposal practices will involve one or more of the following: (1) co-disposal with sewage sludge at a waste water treatment plant; (2) lagooning with and without natural freezing requiring ultimate disposal of the residue at some future time; (3) mechanical dewatering with landfilling of residue; and (4) coagulant recovery. Mechanical dewatering is expensive, especially for plants with a water treatment capacity of less than 50 million gallons per day. Co-disposal is often not practical since access to a sewer may not be available. Lagooning also may be a viable alternative at plants where tracts of inexpensive land are available; however, of all the potential methods of sludge treatment, only coagulant recovery offers the potential of reducing the size of facilities required and providing a lower life cycle cost.

Several processes have been proposed for the recovery of coagulants, particularly alum. One process involves a substantial lowering of the pH to solubilize the metal ion in a metal hydroxide precipitate by the addition of acid in the manner described in U.S. Pat. No. 3,959,133. In the acid process, sludge, usually from settling basins and filter backwashing, is collected in an equilization tank and subsequently thickened by gravity. The supernatant water from the tank is usually returned to the plant raw water intake. Acid, usually sulfuric acid, is added to the thickened sludge at a concentration determined by the amount of metal hydroxide in the sludge and the desired level of recovery. In general, aluminum recovery in excess of 80 percent can be expected at pH of 2.5 or lower. The dissolved aluminum, in the form of aluminum sulfate (liquid alum), is separated from the residual solids by a gravity separator and returned to storage for reuse while the residual sludge is disposed of by landfilling following neutralization.

The acid process for alum recovery presents a potentially serious problem in that it is vulnerable to the accumulation of certain impurities in the recovered alum. If this occurs, and the recovered alum is used for water treatment, it may cause a degradation of the potable water. The potential impurities include: (1) impurities capable of being converted to a soluble form in the acidulation process such as iron, manganese, chromium, other metals and a wide variety of organic materials; and (2) impurities from impure sulfuric acid. The process is not being used in areas where there could be a problem with impurities for this reason.

The principal prior art in the use of APA liquid ion exchange for alum regeneration is described in the Journal of Water Pollution Control (April 1977) by J. Zoltek, Jr. and by D. A. Cornwell, the inventor herein. In this process, insoluble hydroxy aluminum phosphate in an aqueous solution as a dispersed sludge from alum treatment of waste water is acidified with sulfuric acid to dissolve the hydroxide and form aluminum ions in a very acidic solution of pH 2.0 or lower. An APA in a water immiscible organic solvent is then used to extract the solubilized aluminum ion from the aqueous solution and form an aluminum alkyl phosphate salt in the organic solvent. The organic solvent is then extracted or stripped with sulfuric acid to regenerate the APA and remove the aluminum ion to form liquid alum. The waste water or raffinate is neutralized from pH 2.0 up to about pH 7.0 usually with lime. This prior art process works well but requires the acid addition step for the solubilization of the insoluble metal hydroxides which produces significant materials and equipment costs. The assumption in this process and other prior art ion exchange extraction processes using an APA is that it is necessary to provide dissolved metal ions in a highly acidic aqueous solution before the step of extraction with an APA. The basic data in this publication in regard to useful APA's and extraction and stripping equipment provides a starting point for the present invention.

OBJECTS

It is therefore an object of the present invention to provide a process wherein a metal ion can be extracted directly from an insoluble metal hydroxide or salt dispersed in an aqueous solution using an APA without lowering the pH to solubilize the metal ion. Further it is an object of the present invention to provide a process which does not accumulate metal ions in the liquid alum recovered as in the acid process. Further still it is an object of the present invention to provide a process which is relatively inexpensive by comparison to the prior art acidic ion exchange processes. These and other objects will become increasingly apparent from the following description and the drawings.

IN THE DRAWINGS

GENERAL DESCRIPTION

Figure 1:
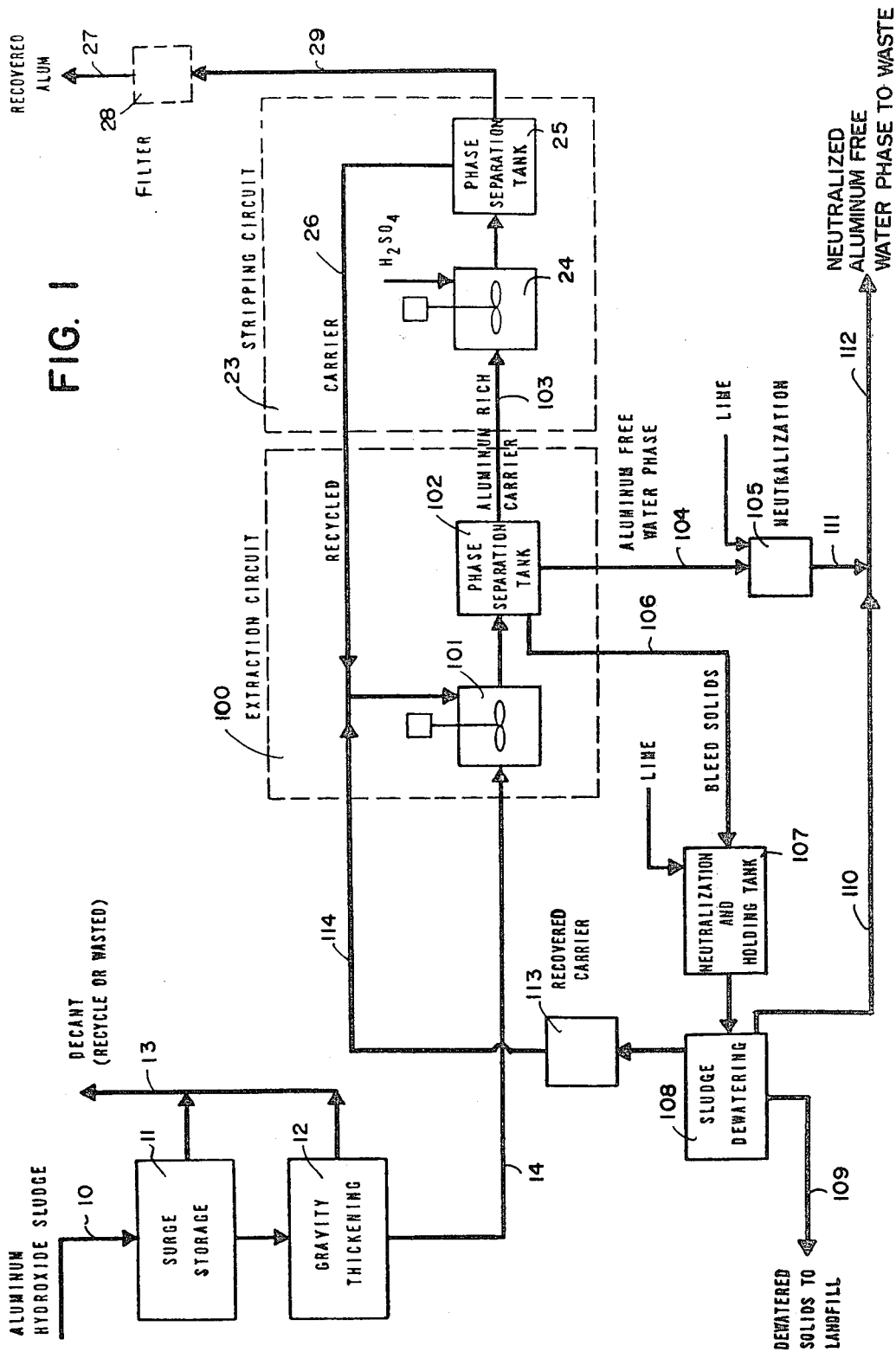
FIG. 1 is a schematic flow diagram of the process of the present invention particularly illustrating liquid ion exchange extraction of aluminum ions directly from an insoluble aluminum hydroxide dispersed in an aqueous solution having a pH between about 4.0 and 8.0 using an APA in a water immiscible organic solvent.

The present invention relates to the improvement in the process for extracting and recovering a metal ion from a substantially water insoluble metal hydroxide or hydroxide containing metal salt which is dispersed as a flocculant in an aqueous solution usually with other dissolved or dispersed compounds by liquid exchange of a hydrogen ion from an alkyl phosphoric acid or acid phosphate extractant dissolved in a water immiscible organic solvent, the improvement which comprises: contacting the aqueous solution containing the flocculant, insoluble metal hydroxide or metal salt with the organic solvent containing the alkyl phosphoric acid or acid phosphate which solubilizes or reacts upon the hydroxide or salt to form a metal ion by providing the aqueous solution in admixture with the organic solvent so that where the solution and solvent are in contact the metal ion from the insoluble hydroxide or salt is extracted by the alkyl phosphoric acid or acid phosphate and replaces the hydrogen ion to form an alkyl phosphate metal salt in the organic solvent and the hydrogen ion is transferred to the aqueous solution; separating the aqueous solution from the organic solvent containing the alkyl phosphate metal salt; and acidifying the organic solvent with an aqueous acidic solution so that the metal ion is removed from the alkyl phosphate salt and is transferred to the aqueous acidic solution as a metal salt of the acid and the alkyl phosphoric acid or acid phosphate is regenerated in the organic solvent. What is particularly unexpected about the process of the present invention is that the metal ion does not have to be solubilized prior to the ion exchange.

The present invention particularly relates to improving the process for aluminum sulfate recovery from a sludge produced during aluminum sulfate coagulation treatment of potable water which comprises: providing an aqueous sludge-aluminum sulfate flocculant mixture containing dispersed aluminum hydroxide and containing between about 0.5 to 12 percent suspended solids by weight and having a pH between about 4 and 8; providing a water immiscible organic solvent containing an alkyl phosphoric acid or acid phosphate as an extractant dissolved therein as a liquid ion exchange extractant mixture; contacting the aqueous mixture with the extractant mixture by providing the aqueous mixture in admixture with the extractant mixture so that where the extractant mixture and aqueous mixture are in contact the aluminum hydroxide is solubilized or reacted upon by the extractant to form an aluminum ion which reacts with the extractant to form an alkyl phosphate aluminum salt in the organic solvent and a hydrogen ion is transferred to the aqueous mixture; separating the aqueous mixture and the extractant mixture containing the alkyl phosphate aluminum salt; and contacting the extractant mixture with aqueous sulfuric acid so that aluminum sulfate forms in an aqueous phase which can be reused as a coagulant and the alkyl phosphoric acid or acid phosphate is regenerated in the organic solvent. In the improved process of the present invention, the APA in the organic solvent solubilizes the aluminum hydroxide or other insoluble metal hydroxide or salt while it is in the aqueous solution and then proceeds to exchange the metal ion for the hydrogen ion which is a very unexpected result. The process is particularly adapted to flocculant metal hydroxides which are solubilized by the extractant mixture.

Liquid ion exchange has been used by chemical process industries for many years. In all known instances the metal ion to be extracted is dissolved in an aqueous solution. Typical commercial applications include the recovery of uranium, zinc, vanadium, tungsten, rare earths, copper, chromium, gold, nickel, cobalt, and iron. Developments nearing commercial application include recovery of platinum group metals, molybdenum, and rhenium. In principle, almost any metal and most of the non-metals can be separated and purified by a liquid-ion exchange or solvent extraction method.

In liquid-ion exchange, a small quantity of an organic solvent soluble chemical referred to as the extractant is dissolved in a second organic liquid referred to as the diluent. The mixture is known as the extractant mixture or carrier. During the extraction operation, the extractant reacts chemically with the desired metal from the aqueous phase forming a metal-extractant salt or complex which is also soluble in the diluent.

The APA is preferably a lower alkyl phosphoric acid i.e. those containing 4 to 10 carbon atoms in the lower alkyl group. Such compounds are well known to the prior art and many are commercially available and particularly include mono- and di-n-butyl; iso-amyl; mono- and di-iso-octyl, including mono- and di-(2-ethylhexyl), phosphoric acids and mixtures thereof. Preferred is an equimolar mixture of mono- and di-(2-ethylhexyl)phosphoric acid. There are also corresponding alkyl acid phosphates which will function in the same manner particularly di-(2-ethylhexyl)pyrophosphate (DEHPyP). This class of compounds is well known to those skilled in the art.

The water immiscible solvents include the petroleum solvents including kerosene and naptha and the like which solubilize the APA. Preferably the organic solvents have a high flash point, are non-toxic and are liquid at the temperatures used for the processing, usually ambient room temperatures.

It is preferred to use the process of the present invention to extract flocculant metal hydroxides dispersed in an aqueous solution. For some reason, the extractant mixture has a high affinity for these compounds in liquid-liquid contact. Such metal hydroxides particularly include aluminum, iron or magnesium hydroxide or mixtures thereof which occur in potable water sludges resulting from coagulation treatments with magnesium, iron or aluminum salts, particularly sulfates, and also iron chloride, magnesium bicarbonate.

The stripping acid solution contains a strong acid, preferably one which is inexpensive and readily available such as sulfuric acid. Sulfuric acid is used where liquid alum is to be produced and reused. Another inexpensive acid is hydrochloric acid which can be used and in this instance aluminum chloride is formed which can be sold commercially. Other mineral and organic acids can also be used but are not preferred.

SPECIFIC DESCRIPTION OF ALUM RECOVERY PROCESS

Figure 2:
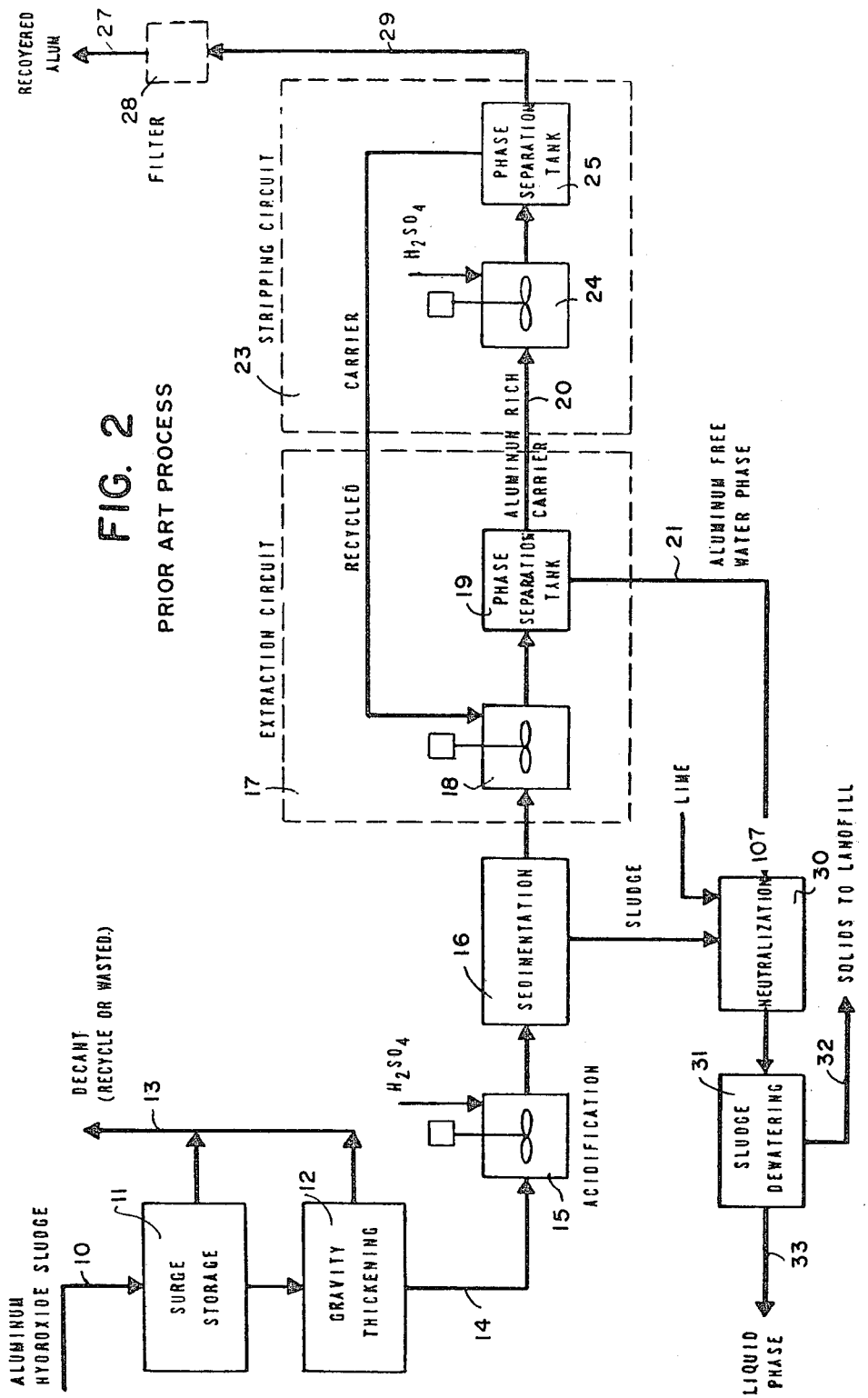
FIG. 2 is a schematic flow diagram of the prior art acid ion exchange process for the recovery of alum wherein the insoluble aluminum hydroxide is first dissolved with aqueous sulfuric acid prior to extraction with an APA.

The prior art and the improved ion exchange process flow diagrams for the recovery of alum from aluminum hydroxide sludges produced by a potable water supply treatment plant are shown on FIGS. 1 and 2. The process can be performed on a batch or continuous basis, preferably the latter. The principal difference in the processes is in the pH of the sludge prior to ion exchange treatment. In both processes liquid-ion exchange takes place in the extraction circuit 17 or 100.

In both processes, an aluminum hydroxide sludge stream 10 comes from a water supply treatment plant as the underflow from the plant sedimentation basins and/or filter backwash. This stream 10 is fed into a surge storage facility 11 such as a large basin or lagoon. Sludge settling may take place in this facility 11 or its contents can be mixed for a continuous flow influent to a gravity thickening facility 12. The surge storage 11 and thickening 12 are optional depending upon particular plant. Overflow 13 from the settling and/or thickening facility 12 may be recycled to the plant raw water supply, discharged to a water course, or disposed of in a sanitary sewer. The thickened sludge at a solids concentration ranging from 0.5 to 12 percent, depending on the characteristics of the particular sludge, is the influent 14 to the alum recovery process.

In the prior art process, there is an initial acidification in tank 15 to a pH of about 2 usually with concentrated sulfuric acid. Gravity settling in the sedimentation tank 16 is rapid for the acidulated sludge. The liquid overflow to the extraction circuit 17 from the sedimentation tank 16 is dilute alum resulting from the reaction of sulfuric acid and aluminum hydroxide in the sludge and usually contains contaminants not removed by gravity settling. Settling in tank 16 is eliminated in the improved process.

The ion exchange occurs in the extraction circuit 17 or 100 at the interface of the two liquids in the extraction in a tank 18 or 101. The extraction occurs by agitating the organic solvent containing the APA and water mixture to form a dispersion of small water droplets in the solvent. The positively charged aluminum ion is believed to move to the carrier/water interface. The aluminum ion exchanges for the positive hydrogen ion and the hydrogen ion enters the aqueous phase. The dispersed phases flow to a separation tank 19 or 102 where rapid coalescence into two distinct phases takes place, resulting in an aluminum-rich carrier phase 20 or 103 and an aluminum-free aqueous phase 21 or 104. Usually the volume ratio of carrier to thickened sludge is between about 1.5:1 and 3:1 in the improved process extraction circuit 100 whereas in the prior art process the ratio is about 1:1. The aqueous phase 21 or 104 is neutralized in a tank 22 or 105 with lime.

The second major part of the liquid-ion exchange operation is the stripping circuit 23 which is identical in both processes. The aluminum ion is stripped from the carrier phase using sulfuric acid in tank 24 in a concentrated form and recovered in a phase separation tank 25. The carrier is recycled 26 to the extraction tank 18 or 107. The liquid alum 27 is passed through a carbon filter 28 if necessary and reused as a potable water coagulant. In general, the extraction circuit 17 or 100 does the largest degree of purification of the aluminum ion because of the selectivity of the solvent used, while the major part of the concentration of the ion is done in the stripping circuit 23.

As between improved process shown in FIG. 1 and the prior art process shown in FIG. 2, the significant difference is that the steps of initial acidification in tank 15 and settling in tank 16 before the extraction circuit 17 (FIG. 2) are eliminated.

In the improved process (FIG. 1), any residual solids are removed in a bleed stream 106 from the separation tank 102 of the extraction circuit 100. The bleed stream may first be neutralized in a tank 107, then dewatered 108 to remove a small amount of solids and the sludge 109 sent to a landfill. The elements 108 and 113 can be a centrifuge or other dewatering device which separates solids, raffinate and solvent. The raffinate 110 is combined with the raffinate 111 from the neutralization 105 and the cleansed water 112 sent to the waste. Any carrier which separates from the aqueous phase during dewatering in tank 108 is recovered in a centrifuge 113 or other separatory means and recycled 114 to the extraction tank 101. In general, only a small amount of carrier needs to be recycled in this manner.

In the prior art process the raffinate 21 is neutralized with lime in a tank 30 and filtered 31. The solids 32 are sent to a landfill and the raffinate water 33 is sent to the waste. Because of the acidification step in tank 15, large amounts of lime are used in the neutralization tank 30 and the resultant calcium sulfate is a filtering and disposal problem.

The improved process has a much lower solids flow because of the reduced requirement for acid neutralization and the resulting calcium sulfate disposal, thus reducing the size of the prior art neutralization 30 and residue dewatering systems 31. The improved process prevents aluminum ion loss in the sludge 109 and results in a higher net recovery of alum. In the improved process, lime demand for neutralization in tanks 105 and 107 is reduced and gypsum (calcium sulfate) is not produced in a large amount in the neutralization of the aluminum free water phase in tank 105. Substantial gypsum is produced in the prior art process in tank 30, negating the reduction in the amount of residue solids 32 by the aluminum recovery.

The improved alum recovery process is clearly economic for plants with low concentrations of suspended solids in the raw water. The cost per ton of dry solids as compared to pressure filtration was determined to be about one-sixth. One of the important considerations of the improved alum recovery system is the characteristics of the residue 109 produced. Soluble aluminum ions in residue 109 are a potential hazard in landfill operation because of toxicity to aquatic life and in the improved process residue 109 is virtually free of soluble aluminum ions. The improved alum recovery process reduces the amount of solids in the residue 109 requiring disposal by about 30 to 35 percent by weight based upon influent solids for plants with a low concentration of suspended solids in the raw water source because of the dissolution of aluminum hydroxide. A pressure filtration process adds about 10 percent to the dry weight of the residue solids requiring disposal as a result of lime conditioning. In addition, the residue of the present invention provides a greater load bearing capacity in a landfill than the pressure filtration residue because of the elimination of the aluminum hydroxide.

SPECIFIC EXAMPLE

The following is a specific example of the preferred continuous process of the present invention on a bench scale.

Example 1

The aluminum hydroxide containing coagulant sludge 14 was at approximately pH 6.8 and had a suspended solids concentration of 2%. The aluminum concentration was 1600 mg/l as $Al^{3+}$. The pH of this solution was lowered to approximately 5.0 in order to obtain a raffinate 104 at pH 2.0.

The sludge was fed to a one-stage mixer-settler 101 and 102 for extraction 100. The feed flow rate was 6 ml/min. The carrier was naptha containing 20% by volume octyl acid phosphate (approximately 60% di(2-ethylhexyl) phosphoric acid, 40% mono (2-ethylhexyl) phosphoric acid) and 2% tributyl phosphate dissolved therein. The carrier flow rate was varied and a satisfactory operating flow rate was 12 ml/min (carrier to aqueous flow rate ratio of 2:1). In this manner, the raffinate 104 pH was maintained at 2.0 and aluminum ion removal in the extraction circuit 100 was over 90%.

The residual solids were bled from the interface of the extraction settler 102, centrifuged 113 and the carrier was returned to the system 114. The carrier is loaded with aluminum mono- and di-octyl phsphate and thus is not affected by the neutralization. The aluminum-rich solvent 103 flowed from the extraction settler 102 into a two-stage counter-current mixer-settler 24 and 25 for stripping. The stripping agent was 6 N $H_2SO_4$ at a flow rate of 0.22 ml/min resulting in a recovered liquid alum solution containing 44,000 mg/l $Al^{3+}$.

Table I shows a typical material balance for the process shown in FIG. 1.

TABLE I

| Conduit | Parts by Volume | Composition |
|---------|-----------------|-------------|
| 14 | 100 | Sludge |
| 104 | 84 | Raffinate |
| 114 and 26 | 200 | Solvent |
| 103 | 196 | Aluminum Rich Solvent |
| 26 | 196 | Stripping |
| 114 | 4 | Bleed Solids Solvent |
| 106 | 20 | Bleed Solids |
| 110 | 15 | Raffinate |
| 109 | 1 | Solids |
| 114 | 4 | Solvent |
| 104 | 84 | Water phase |

Tests were performed on the extraction of aluminum from alum sludges utilizing various extractants. The sludge was obtained from the Shenango Valley Water Treatment Plant, Sharon, PA. The sludge was produced by the addition of alum (aluminum sulfate) to the raw water. The sludge contained 900 mg/l soluble aluminum at a pH 7.0. The suspended solids concentration was 2%.

Example 2 di (2-ethylhexyl)phosphoric acid (DEHPA)

DEHPA was diluted in a kerosene base diluent (tradename Kermac 627) to a 20% by volume concentration. 100 ml of the 20% DEHPA was contacted with 50 ml of a sludge (organic to aqueous ratio of 2:1 for 10 minutes. The resulting raffinate contained 6 mg/l $Al^{3+}$, or 99% extraction.

Example 3 di (2-ethylhexyl) pyrophosphate (DEHPyP)

DEHPyP was diluted in Kermac 627 to a 20% volume concentration. 100 ml of the 20% DEHPyP was contacted with 50 ml of sludge for 10 minutes. The resulting raffinate $Al^{3+}$ concentration was 150 mg/l $Al^{3+}$, or 83% extraction.

Tests were performed on the extraction of various metals in the precipitate form by mono-di (2-ethylhexyl) phosphoric acid (MDEHPA). In all tests the MDEHPA was a 10% by volume concentration diluted in Kermac 627. In all cases 100 ml of 10% MDEHPA was contacted with 50 ml of aqueous for 15 minutes.

Example 4

$Fe(OH)_3$

Iron sludge was obtained from the Shenango Valley Water Treatment Plant, Sharon, PA. The sludge was produced by the addition of $FeCl_3$ to the raw water.
Initial aqueous pH = 7.4
Soluble Fe concentration = 920 mg/l
Raffinate pH = 1.7
Raffinate Fe = 4.6 mg/l, or 99% extraction

Example 5

$Mg(OH)_2$

This was a synthetic precipitate prepared in the lab.
Initial aqueous pH = 11.0 (only exists as a precipitate at high pH)
Initial aqueous Mg = 1000 mg/l
Raffinate pH = 1.7
Raffinate Mg = 100 mg/l, or 90% extraction

Example 6 hydroxy aluminum phosphate

This sludge was prepared in the laboratory by precipitating phosphorus with aluminum to simulate alum coagulation in waste water treatment for phosphorus removal.
Initial aqueous pH = 7.0
Initial Al concentration = 1000 mg/l
Raffinate pH = 1.4
Raffinate Al = 0.6 mg/l, or 99% extraction

Example 7

Copper salt (probably of the form $CuCO_3 \cdot Cu(OH)_2$ which is natural malachite).

This precipitate was prepared in the lab to simulate naturally occurring copper carbonate salt. The pH of a copper carbonate solution was raised until precipitation was completed.
Initial aqueous pH = 10.9
Initial Cu = 1080 mg/l Raffinate pH=1.3
Raffinate Cu=116 mg/l, or 89% extraction Examples 4 to 7 show the use of an APA extractant to extract various metals. Iron and magnesium are also used in potable water treatment, hence Examples 4 and 5. Another important application is alum addition in waste water treatment (sewage) for phosphorus removal as in Example 6. Iron is also used in waste water treatment for phosphorus removal as in Example 4. One of the naturally occurring copper salts is malachite. This mineral was made synthetically as shown in Example 7.

Example 8

The purpose of this experiment was to evaluate the performance of the contactor of U.S. Pat. No. 3,649,209 when operated using cocurrent flow (and not countercurrent) of diluent and sludge in conjunction with the alum recovery process disclosed in Example 1. Two alum sludges were evaluated, one from Tampa, Fla. and one from Sharon, Pa. The extractant and solvent of Example 1 were used.

Figure 3:
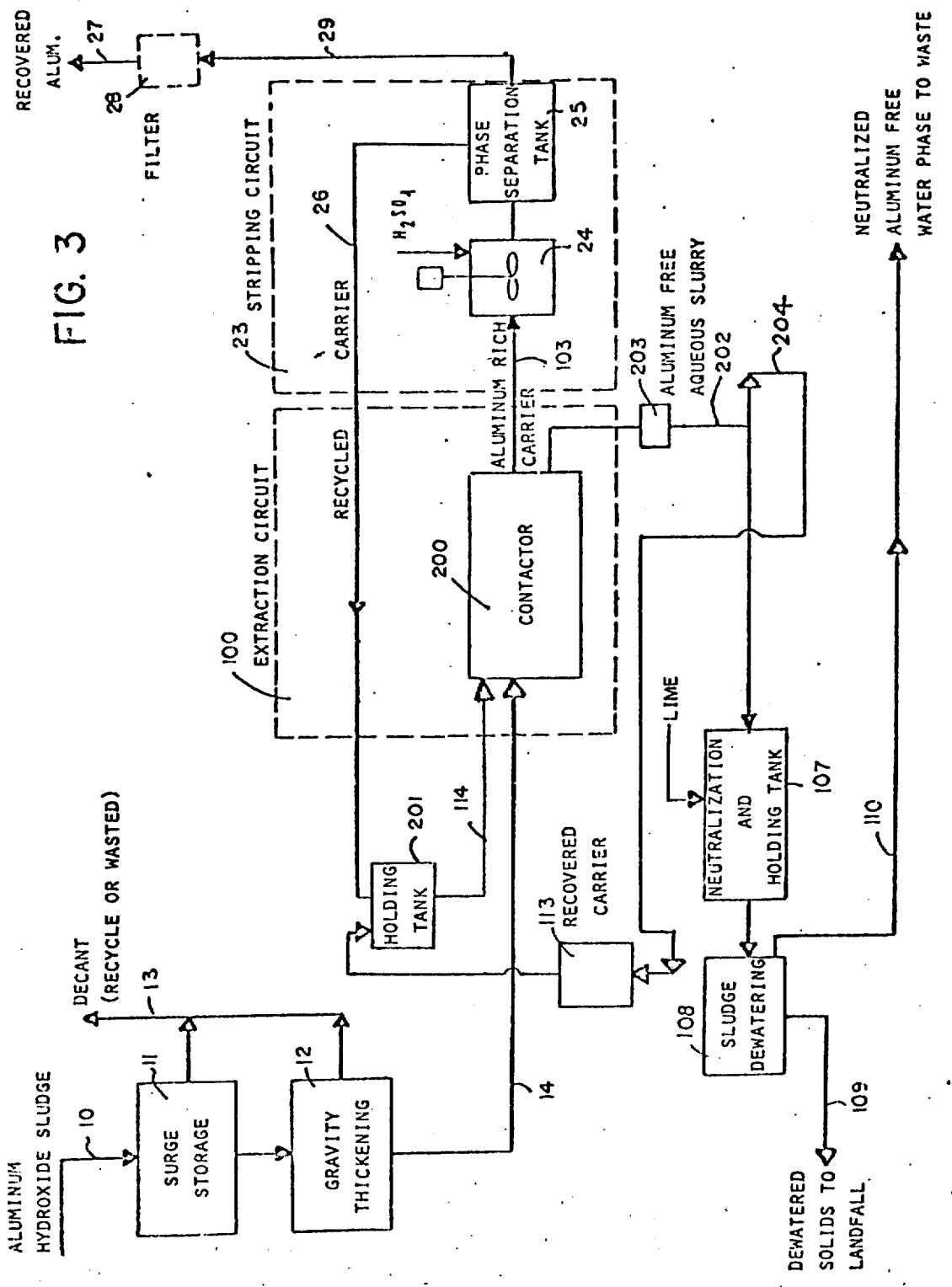
FIG. 3 is a schematic flow diagram of a preferred process of the present invention showing the use of a contactor.

The equipment used is shown in FIG. 3 which involves a modification of FIG. 1 in the extraction circuit. A 4" (10.2 cm) diameter, 39.63" (100.7 cm) long contactor 200 as described in U.S. Pat. No. 3,649,209 was used for aluminum extraction. This extractor 200 had a calculated volume of 8.16 liters. The sludge feed 14 and feed solvent 114 from holding tank 201 were pumped into the contactor 200 and the extract 103 was pumped out. The raffinate discharge 202 rate was controlled by a static head tank 203. The raffinate 202 flowed to a sedimentation tank 107 for collection of the solids. The overflow from the sludge dewatering tank 108 flowed to waste 110. Stripping of the extract 103 was done with a two-stage counter-current mixer 24 and settler 25 tank as in FIG. 1.

The Tampa sludge contained between 750 and 1250 milligrams per liter of $Al^{3+}$, depending upon the sample. The feed suspended solids concentration varied from 0.3 to 0.6% by weight. The Sharon, Pa. sludge contained 500 to 800 milligrams per liter $Al^{3+}$ as a 1% by weight solids concentration.

TAMPA SLUDGE RESULTS

Figure 4:
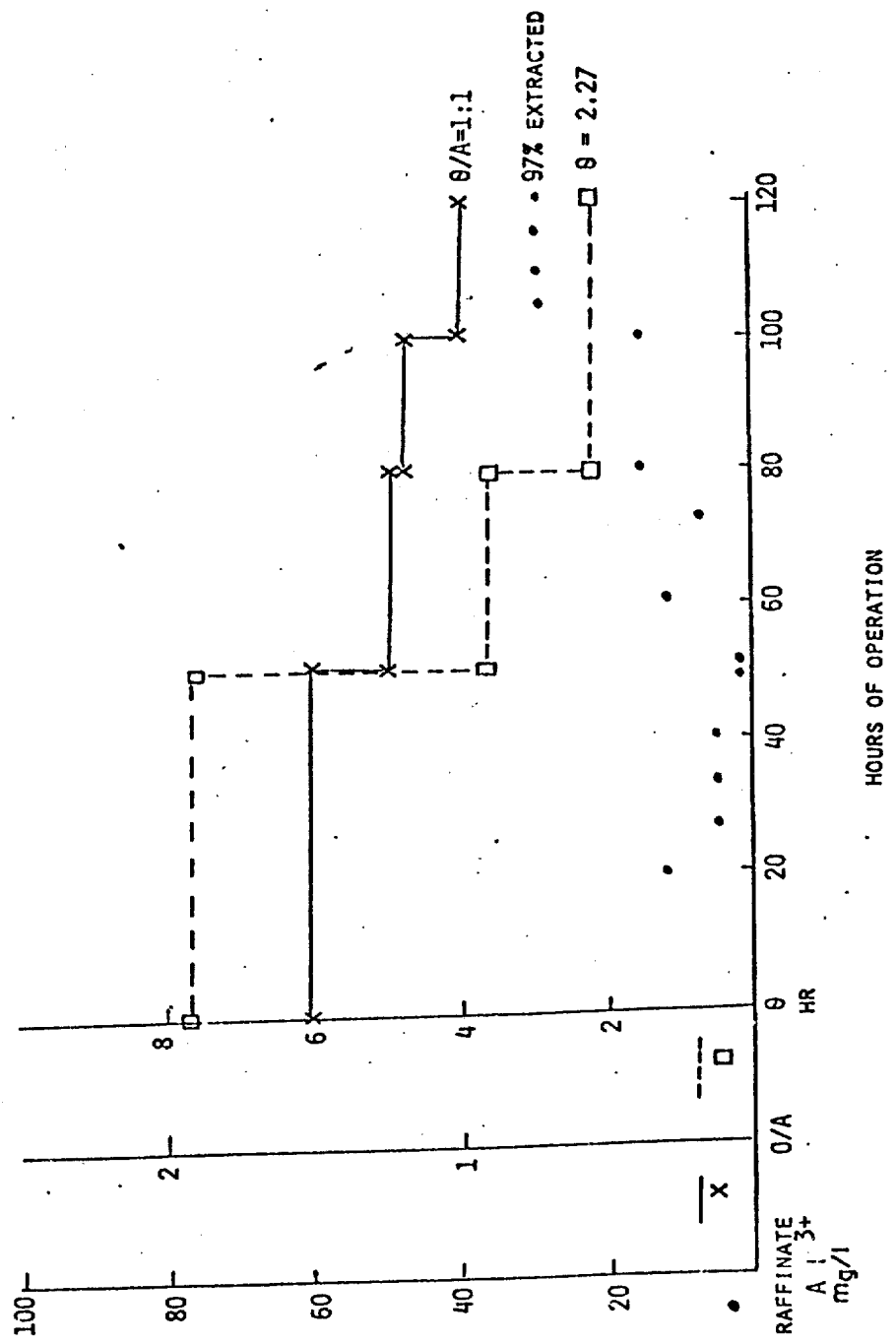
FIG. 4 is a graph showing hours of operation as a function of various operating parameters as set forth in Example 8.

FIG. 4 shows three graphs superimposed as a function of the hours of operation of the contactor 200. The retention time ($\theta$) is the average time the sludge 14 is retained in the contactor.

The sludge flow 14 was started at a rate corresponding to a 6.8 hour aqueous detention time ($\theta$). The solvent 114 to aqueous sludge feed phase 14 volume ratio (O/A) was 1.5:1. The system was operated in this manner for about 50 hours (see FIG. 4), well into the range of steady state. After about 20 hours the units settled down and extraction remained above 99% by weight. For the next 30 hours the aqueous detention time ($\theta$) was lowered to 3.4 hours and the organic/aqueous (O/A) volume ratio lowered to 1.25:1. The percent extraction remained above 98% by weight. Between 80 and 100 hours of operation, the detention time ($\theta$) was lowered to 2.2 hours and the organic/aqueous (O/A) volume ratio to 1.2:1. Aluminum extraction was maintained at 98% by weight. For the last 20 hours the organic flow rate was lowered to a corresponding organic/aqueous (O/A) flow ratio of 1:1 volume. Aluminum extraction dropped insignificantly to 97% by weight. During these tests the recovered alum was maintained at 43,000 mg/liter $Al^{3+}$ upon removal from the mixer 24 and settler 25 through line 27.

During extraction with the contactor 200, the solids did not form an emulsified bleed stream 106 as in the process of FIG. 1 and Example 1. Instead the solids remained in the water phase and were removed from the contactor 200 in the raffinate 202. The residual solids in the raffinate 202 tend to settle rapidly.

In extraction of Tampa sludge, the raffinate 202 flowed to a 1400-ml volume thickener or holding tank 107, where the solids were thickened to a 10.1% by volume suspended solids concentration.

SHARON SLUDGE RESULTS

The system was started on Sharon sludge using the same extractant and solvent which had already operated on Tampa sludge for 120 hours. The system was operated for about 20 hours at the final ratio and holding conditions used for Tampa sludge testing. At the 2.2 hour aqueous detention time and 1:1 by volume organic to aqueous sludge flow rate, the raffinate 202 contained between 6 and 30 mg/liter of $Al^{3+}$.

As in operation on the Tampa sludge, the raffinate 202 remaining after aluminum extraction from Sharon sludge contained the residual solids. The residual solids thickened to a final sludge concentration of 9.8% by volume suspended solids in the holding or thickening tank 107.

It was found that the operation of the process with the contactor 200 was preferred. The use of the contactor 200 in place of the mixer-settler 101 and 102 in the process shown in FIG. 1 has advantages which make the process particularly economically viable. The raffinate 202 is a slurry, in which the solids are largely in granular form which readily separate from the liquid on standing. As a consequence, the sludge dewatering stage 108 is considerably facilitated. In contrast to the contactor 200, the vigorous action of the mixer-settler 101 and 102 (FIG. 1) causes virtaully all of the solids initially in the aqueous phase in the sludge 14 to appear as a third phase 106 between the raffinate 104 and organic phases 103. This third phase 106 comprises a mixture of solids, organic solvent and water and must be further treated usually in a centrifuge 113 to recover the organic solvent. By comparison, the contactor 202 produces a minimal quantity of a third phase 204 which if necessary can be separated off and treated for solvent recovery in small equipment or on a batch basis (not shown) or in 113.

The contactor 200 based process shown in FIG. 3 can provide operating cost savings compared with the mixer-settler 101 and 102 based process shown in FIG. 1. The contactor 202 is less expensive than the mixer-settler 101 and 102. The operation of the contactor 202 in producing a distinct granular solids containing raffinate 202, with a minimal third phase, is unexpected. Other apparatus which produce the result of a slow blending or gentle intermingling of the separate phases of the aqueous solution and extractant-solvent mixture, preferably concurrently, can be used where a high surface area thin stream of the aqueous solution is flowed through the organic solvent and/or a thin stream of solvent is flowed through the aqueous solution on a continuous basis. Other related contactors which can be used in the present invention are described in British Pat. Nos. 860,880; 972,035 and 1,037,573. These contactors use vertically rotating cups around a horizontal, slowly rotating shaft in a confined chamber for the gentle intermingling.

As can be seen from the foregoing description, the improved ion exchange process, particularly as applied to alum recovery, is very efficient. It represents a considerable improvement over the prior art.

I claim:

1. In the process for extracting and recovering a metal from a substantially water insoluble metal hydroxide or hydroxide containing metal salt by liquid-liquid exchange using an alkyl phosphoric acid ester or an alkyl acid phosphate ester extractant which provides a hydrogen ion and an extractant ion and which is dissolved in a water immiscible organic solvent, the improvement which comprises:
   (a) providing an aqueous solution including a flocculated substantially water insoluble metal hydroxide or hydroxide containing metal salt, the solution having a pH of about 4 to 11, wherein the metal hydroxide or hydroxide containing metal salt is formed in the aqueous solution and is not dissolved to form metal ions by the addition of acid to the aqueous solution;
   (b) contacting the aqueous solution containing the flocculated, insoluble metal hydroxide or metal salt with the organic solvent containing the alkyl phosphoric acid ester or alkyl phosphate acid ester to that the hydrogen ion from the ester is transferred to the aqueous solution and the pH of the aqueous solution is lowered, and the metal from the insoluble hydroxide or salt is extracted by the alkyl phosphoric acid ester or alkyl phosphate acid ester and replaces the hydrogen ion to form an alkyl phosphate metal salt in the organic solvent, wherein the contacting is without acidification of the aqueous solution with an acid other than the extractant and wherein the metal from the hydroxide is preferentially extracted from the aqueous solution;
   (c) separating the aqueous solution from the organic solvent containing the alkyl phosphate metal salt; and
   (d) acidifying the organic solvent with an aqueous acidic solution so that the metal is removed from the alkyl phosphate salt and is transferred to the aqueous acidic solution as a metal salt of the acid and the alkyl phosphoric acid ester or alkyl phosphate acid ester is regenerated in the organic solvent.

2. The process of claim 1 wherein the extraction and recovery is of a metal hydroxide.

3. The process of claim 2 wherein the metal hydroxide is aluminum hydroxide which is formed in potable water treated with aluminum sulfate as a coagulant.

4. The process of any one of claims 2 to 3 wherein the pH of the aqueous solution containing the insoluble metal hydroxide is between pH 4 to 8.

5. The process of claim 2 wherein the metal hydroxide is iron hydroxide or magnesium hydroxide.

6. The process of any one of claims 1, 2 or 3 wherein the alkyl phosphoric acid is a mixture of mono- and di-(2-ethylhexyl) phosphoric acids.

7. The process of claim 6 wherein the mixture is equimolar.

8. The process of any one of claims 1, 2 or 3 wherein the organic solvent is a petroleum solvent.

9. The process of claim 2 wherein the hydroxide is a hydroxy aluminum phosphate formed in phosphate removal in wastewater.

10. The process of claim 1 wherein the organic solvent containing the alkyl phosphate salt is acidified with an aqueous sulfuric acid solution such that a metal sulfate is formed.

11. The process of claim 10 wherein the metal hydroxide is aluminum hydroxide and the metal sulfate is aluminum sulfate.

12. The process of claim 1 wherein the contacting is such that a thin stream of the aqueous solution flows through the organic solvent or a thin stream of the solvent flows through the solution or a combination of both.

13. The process of claim 1 wherein the contacting of cocurrent streams of separate phases of aqueous solution and organic solvent by gentle intermingling using vertically rotating cups radially around a horizontal slowly rotating shaft in a confined chamber is provided.

14. The process for aluminum sulfate recovery from a sludge produced during aluminum sulfate coagulation treatment of potable water which comprises:
   (a) providing an aqueous sludge mixture containing dispersed flocculated aluminum hydroxide and containing between about 0.5 to 12 percent suspended solids by weight and having a pH between about 4 and 8, wherein the aluminum hydroxide has been precipitated as a floc in the aqueous solution by the addition of the aluminum sulfate and once precipitated is not dissolved to form aluminum ions by the addition of acid to the aqueous solution;
   (b) providing a water immiscible organic solvent containing an alkyl phosphoric acid ester or an alkyl phosphate acid ester as an extractant dissolved therein as a liquid ion exchange extractant mixture;
   (c) contacting the aqueous mixture with the extractant mixture by providing the aqueous mixture in admixture with the extractant mixture so that aluminum reacts with the extractant to form an alkyl phosphate aluminum salt in the organic solvent, a hydrogen ion is transferred to the aqueous mixture and the pH of the aqueous solution is lowered, wherein the contacting is without prior acidification of the aqueous solution to dissolve the flocculated aluminum hydroxide with an acid other than the extractant and wherein the aluminum from the hydroxide is preferentially extracted from the aqueous solution;
   (d) separating the aqueous mixture and the extractant mixture containing the alkyl phosphate aluminum salt; and
   (e) contacting the extractant mixture with aqueous sulfuric acid so that aluminum sulfate forms in an aqueous phase which can be reused as a coagulant and the alkyl phosphoric acid-ester or alkyl phosphate acid ester is regenerated in the organic solvent.

15. The process of claim 14 wherein the separated aqueous mixture is neutralized.

16. The process of claim 15 wherein the aqueous mixture is neutralized with lime.

17. The process of claim 14 wherein the organic solvent is naphtha or kerosene and wherein the alkyl phosphoric acid is a mixture of mono- and di-(2-ethylhexyl) phosphoric acid.

18. The process of any one of claims 14, 15, 16 or 17 wherein accumulated residual solids produced during the contacting of the aqueous and extractant mixtures are removed by bleeding from an extraction tank as they accumulate along with small amounts of the aqueous and extractant mixtures, neutralized, treated with separatory means so that extractant mixture is removed and recycled, solids are filtered and water remains.

19. The process of claim 14 wherein the alkyl phosphoric acid is di-(2-ethylhexyl)phosphoric acid.

* * * * *

UNITED STATES PATENT AND TRADEMARK OFFICE
CERTIFICATE OF CORRECTION

PATENT NO. : 4,334,999

Page 1 of 3

DATED : June 15, 1982

INVENTOR(S) : David A. Cornwell

It is certified that error appears in the above-identified patent and that said Letters Patent is hereby corrected as shown below:

Figures 3 and 4 should appear as shown on the attached sheets.

Column 11 line 27, "to" should read -- so --.

*Signed and Sealed this*

*Twenty-first* Day of *December 1982*

|SEAL|

*Attest:*

GERALD J. MOSSINGHOFF

*Attesting Officer*  *Commissioner of Patents and Trademarks*